May 1, 1956    G. ROBERTS    2,743,836
MILK BOTTLE CONTAINER AND CARRIER
Filed May 29, 1952
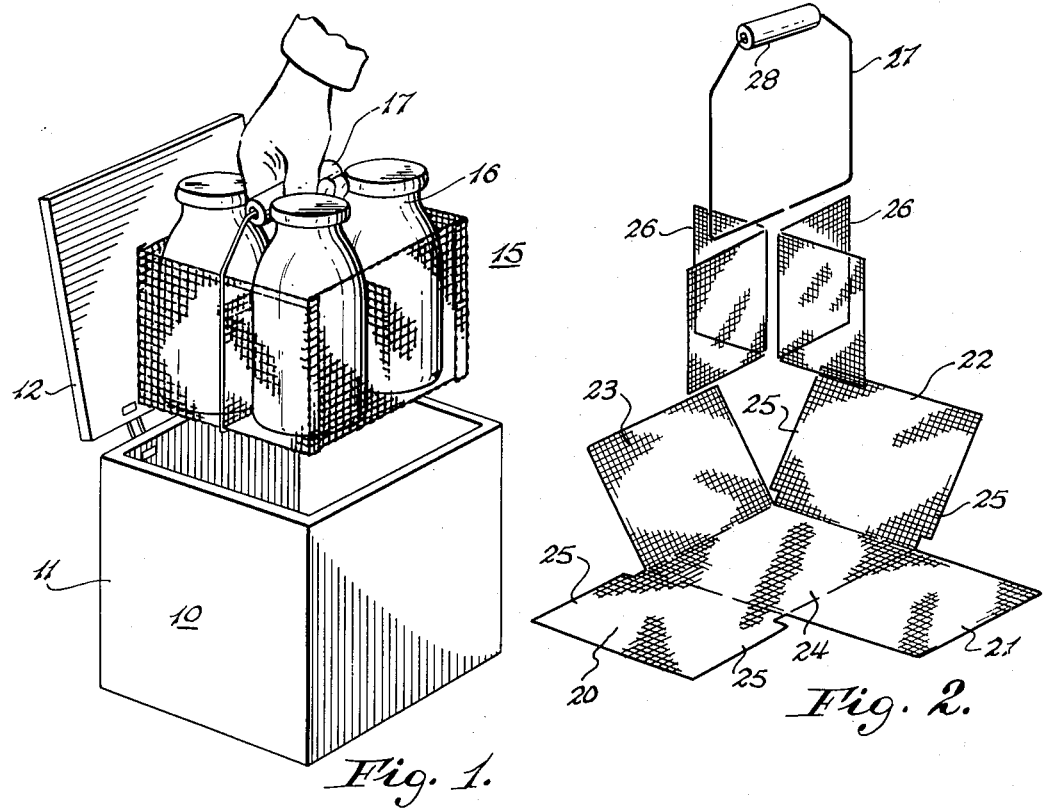
Fig. 1.
Fig. 2.
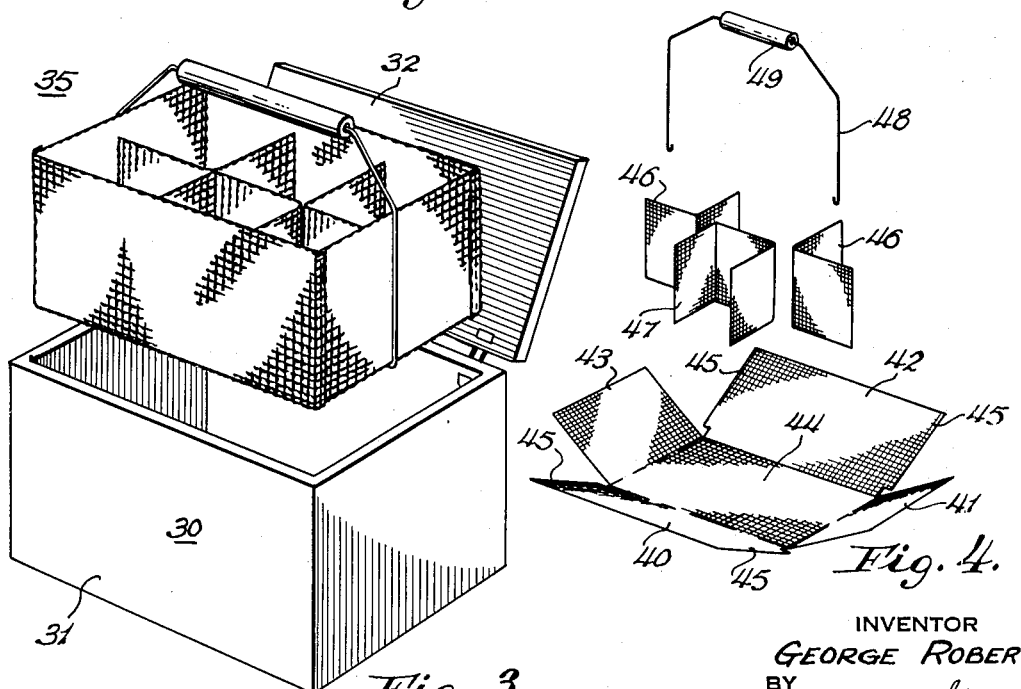
Fig. 3.
Fig. 4.
INVENTOR
GEORGE ROBERTS
BY
John C. McGregor
ATTORNEY

United States Patent Office 2,743,836
Patented May 1, 1956

2,743,836

MILK BOTTLE CONTAINER AND CARRIER

George Roberts, Uniondale, N. Y.

Application May 29, 1952, Serial No. 290,638

1 Claim. (Cl. 217—19)

This invention relates to bottle carriers and storage devices and more particularly relates to storage means for milk bottles and carriers for self delivery of said bottles.

Milk bottle containers are in considerable use throughout the country where home delivery of dairy products is utilized. These continers permit the delivery man to insert the day's delivery of milk and cream in the containers which are generally placed outdoors near the entrance of the consumer's home. In general the containers are closed boxes which prevent the entry of rain or snow, and further prevent such domestic animals as dogs and cats from coming into contact with the bottles. In addition, they provide for shading of the milk bottles from the direct rays of the sun. This aids in keeping the milk cool during the warm summer months.

Certain disadvantages are experienced, however, in the use of such containers. It is extremely difficult for the housewife to remove more than two bottles from the containers at one time. This generally necessitates at least two trips from the kitchen to the entrance of the home where the milk bottle container is located. Any attempt to carry more than one bottle in each hand is extremely hazardous. Of course, if the bottles are moist, as is frequently the case, the hazard is increased.

It is the object of this invention to provide a milk bottle container and milk bottle carrier which will obviate the disadvantages referred to above. To this end this invention provides a milk bottle container which has a milk bottle carrying means positioned therein. The carrying means may be removed from the container, and is of such a construction that only a single hand is needed to safely transport the entire contents of the container unit.

A further object of this invention is to provide a home storage container for milk bottles and a milk bottle carrier to be used in conjunction therewith.

A still further object of the present invention is to provide a milk bottle carrier adapted to fit within a milk bottle container for home use.

Another object of the present invention is to provide a milk bottle carrier adapted to nest within a milk bottle container, said carrier having separate compartments for each bottle.

An additional object of the present invention is to provide a milk bottle carrier and container combination in which said carrier is made up of relatively light material which is strong and durable and one in which the bottles are supported so that they do not come in direct contact with one another.

It is a further object of the present invention to provide a milk bottle carrier and container combination which is simple and durable, which is effective for its intended purposes and which can be economically manufactured and distributed.

Other objects and novel features of the invention will appear more fully hereinafter from the following detailed description when taken in connection with the accompanying drawings. It is to be expressly understood, however, that the drawings are employed for illustrative purposes only and are not designed as a definition of the limits of the invention, reference being had for this purpose to the appended claim.

In the drawings:

Figure 1 is a perspective view of a milk bottle carrier and container for said carrier.

Figure 2 is an exploded view of the milk bottle carrier shown in Figure 1.

Figure 3 is a perspective view of another milk bottle carrier and container.

Figure 4 is an exploded view of the milk bottle carrier shown in Figure 3.

In the drawing similar reference characters refer to similar parts throughout the similar views.

Referring to Figures 1 and 2, the novel milk bottle container and milk bottle carrier combination constructed in accordance with the present invention comprises a container box 10 having closed sides 11 and hinged top 12. This container box is preferably of solid construction so as to keep rain and snow from entering the inside.

Carrier 15 containing milk bottles 16 fits within the container box 10. The carrier 15 is dimensioned to receive four standard quart bottles of milk 16. The box 10 is so dimensional as to receive the carrier 15 in nesting relationship. The height of box 10 is so dimensional that hinged top or lid 12 clears the tops of bottles 16 and carrying handle 17 when it is in the closed position.

Figure 2 shows the detailed construction of carrier 15. The four walls 20, 21, 22 and 23 and square bottom 24 are all preferably formed from a single sheet of foraminated metallic material formed in the shape of a cross. Each arm of the cross is bent upwards until it is at right angles to the central portion of the cross, the whole forming a box like structure. Opposite facing walls 20 and 22 are each provided with a pair of side tabs 25 which fold over the edge of the adjacent wall. The tabs 25 may be joined throughout their length to the adjacent wall by any conventional manner such as soldering or welding.

A pair of L-shaped dividers 26 formed of the same foraminated, metallic material serve to divide the carrier into four compartments, each having a square cross section. The dimensions of each said square cross sectional compartment is such as to receive a standard quart milk bottle with the minimum amount of play. The dividers 26 may also be joined to each other along the length of their bend and in turn to the four walls along their line of contact by any conventional method such as soldering or welding.

A bail 27 extends over the top of the box, down the center of opposite facing walls 20 and 22, and across the bottom 24. The bail 27 is also joined to the walls 20, 22 and bottom 24 along its length by a similar method such as soldering or welding. The bail 27 thus serves as a stiffening member for the structure as well as serving to support the handle 28.

The resulting structure thus forms a carrier which will receive four milk bottles, each bottle fitting into an individual compartment. The whole structure in turn is adapted to nest within a container unti having a hinged lid.

In use, the carrier is stored in the container unit. The milk man, in making his daily delivery, inserts the requested bottles of milk into the compartments provided in the carrier. The housewife or a child is thus enabled to pick up the entire day's delivery of milk simply by grasping the handle of the carrier. This not only requires but one hand, but is completely safe. The empty bottles may be carried from the kitchen to the location of the container by means of the carrier.

The carrier shown in Figure 2 has four compartments for four bottles. In many homes, a single day's delivery exceeds this number. Figure 3 shows a container box 30 having closed sides 31 and hinged top 32. As in the box shown in Figure 1, box 30 is preferably of solid construction to prevent the entry of rain and snow.

Carrier 35, which nests within the container box 30, is so dimensioned to receive six standard quart bottles of milk. Figure 4 shows the detailed construction of carrier 35. The four walls 40, 41, 42 and 43 and rectangular bottom 44 are again formed from a single sheet of foraminated material in the form of a cross. As before each arm of the cross is bent upwards until it is at right angles to central portion or bottom. The edges of each adjacent side are joined in a conventional manner. Side tabs 45 are again provided on the opposite facing sides 40 and 42. These side tabs fold over the adjacent wall and are joined thereto.

A pair of L-shaped dividers 46 and a single U-shaped divider 47 serve to divide the carrier into six separate compartments each having a square cross section dimensioned to receive a milk bottle. Bail 48, fastened to opposite walls of container 35 supports handle 49.

This structure thus forms a carrier adapted to receive six milk bottles, each milk bottle fitting into an individual compartment. As before the whole structure is adapted to nest within a container unit having a hinged lid.

While in the preferred embodiment the carrier unit is constructed of a foraminated metallic material it is readily understood that the carrier could be made of other materials such as plastic, in which case the dividers and sides would be joined by a method conventional with such material. It should also be understood that although the word bottle is used throughout this specification the invention is not intended to be limited to a bottle in its usual sense but is intended to include all milk containers whether formed of glass, plastic or treated paper.

While the invention has been disclosed and described herein with considerable particularity, it is to be understood that the invention is not restricted thereto as the same is capable of receiving a variety of mechanical expressions, some of which will now readily suggest themselves to those skilled in the art, while changes may be made in the details of construction, arrangement and proportion of parts, and certain features used without others, without departing from the spirit of the invention. Reference is, therefore, to be had to the claim hereto appended for a definition of the limits of the invention.

What is claimed is:

Weatherproof means to receive delivery of milk bottles comprising a box-like container of solid material, a cover of solid material hinged to the top edge of said container, an open, box-like bottle carrier having a square-shaped bottom and four sides, said carrier being dimensioned to nest within said container, a pair of L shaped divider members, the first of said pair having two of its edges permanently attached along the vertical centerline of two adjacent walls of said carrier and the second of said pair having two of its edges permanently attached along the vertical centerline of the two remaining walls, the bottom edges of each of said dividers being attached to the bottom of said carrier, the folded edges of said dividers being adjacent, means for fastening said dividers to each other along the length of said fold, and a bail like handle member extending along the centerline of the outer side of a pair of oppositely faced walls of said carrier and permanently affixed thereto.

References Cited in the file of this patent

UNITED STATES PATENTS

| Number | Name | Date |
|---|---|---|
| 266,617 | Fisk | Oct. 31, 1882 |
| 662,801 | Munford | Nov. 27, 1900 |
| 738,301 | Dowd | Sept. 8, 1903 |
| 1,585,032 | Hess | May 18, 1926 |
| 1,731,625 | Hines | Oct. 15, 1929 |
| 1,759,723 | Weld | May 20, 1930 |
| 1,994,553 | Wolcott | Mar. 19, 1935 |
| 1,998,681 | Littleford, Jr. | Apr. 23, 1935 |
| 2,049,884 | Wurster et al. | Aug. 4, 1936 |
| 2,050,980 | Buhl | Aug. 11, 1936 |
| 2,179,981 | Mooter et al. | Nov. 14, 1939 |
| 2,337,923 | Pierce | Dec. 28, 1943 |
| 2,550,355 | James | Apr. 24, 1951 |
| 2,615,749 | Kuchel | Oct. 28, 1952 |